US007810072B2

(12) United States Patent
Barcia

(10) Patent No.: US 7,810,072 B2
(45) Date of Patent: Oct. 5, 2010

(54) EXCEPTION THROWER

(75) Inventor: Roland Barcia, Leonia, NJ (US)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 11/327,575

(22) Filed: Jan. 6, 2006

(65) Prior Publication Data

US 2007/0162246 A1 Jul. 12, 2007

(51) Int. Cl.
G06F 9/44 (2006.01)
(52) U.S. Cl. ...................................... 717/125
(58) Field of Classification Search .......... 717/124–125
See application file for complete search history.

(56) References Cited

U.S. PATENT DOCUMENTS

| 5,526,485 | A | 6/1996 | Brodsky |  |
|---|---|---|---|---|
| 7,496,903 | B2 * | 2/2009 | Rees et al. | 717/130 |
| 2003/0204784 | A1 | 10/2003 | Jorapur |  |
| 2004/0255291 | A1 * | 12/2004 | Sierer et al. | 717/174 |
| 2005/0071806 | A1 * | 3/2005 | Sreedhar | 717/104 |
| 2005/0120276 | A1 * | 6/2005 | Kolawa et al. | 714/38 |
| 2005/0149914 | A1 * | 7/2005 | Krapf et al. | 717/136 |
| 2006/0030295 | A1 * | 2/2006 | Adams et al. | 455/410 |
| 2006/0047617 | A1 * | 3/2006 | Bacioiu et al. | 706/59 |
| 2006/0101431 | A1 * | 5/2006 | Pepin et al. | 717/138 |
| 2006/0112373 | A1 * | 5/2006 | Rokosz | 717/125 |
| 2006/0117055 | A1 * | 6/2006 | Doyle | 707/102 |
| 2006/0288106 | A1 * | 12/2006 | Kumar et al. | 709/227 |
| 2007/0033419 | A1 * | 2/2007 | Kocher et al. | 713/193 |
| 2007/0143751 | A1 * | 6/2007 | Butler et al. | 717/174 |

OTHER PUBLICATIONS

Xu et al., JAOUT: Automated Generation of Aspect-Oriented Unit Test, Proceedings of the 11th Asia-Pacific Software Engineering Conference (APSEC'04) 1530-1362/04.*
Robilliard et al., Designing Robust Java Programs with Exceptions, pp. 1-10, Dept. of Computer Science, University of British Columbia.
Peach et al., Test Case Generation Using Prolog, IEEE 1985, pp. 252-258.

* cited by examiner

*Primary Examiner*—Anna Deng
(74) *Attorney, Agent, or Firm*—Joseph E. Bracken; Law Office of Jim Boice

(57) ABSTRACT

A method, apparatus and computer-usable medium for testing error handling code. The method includes selecting a method signature to be error tested; selecting an error associated with the method signature from a menu; generating an aspect to be used in a pointcut for an exception that is to be thrown for the selected error; invoking code that generates the selected error; and identifying resultant errors caused by a selected component of the selected error.

20 Claims, 15 Drawing Sheets

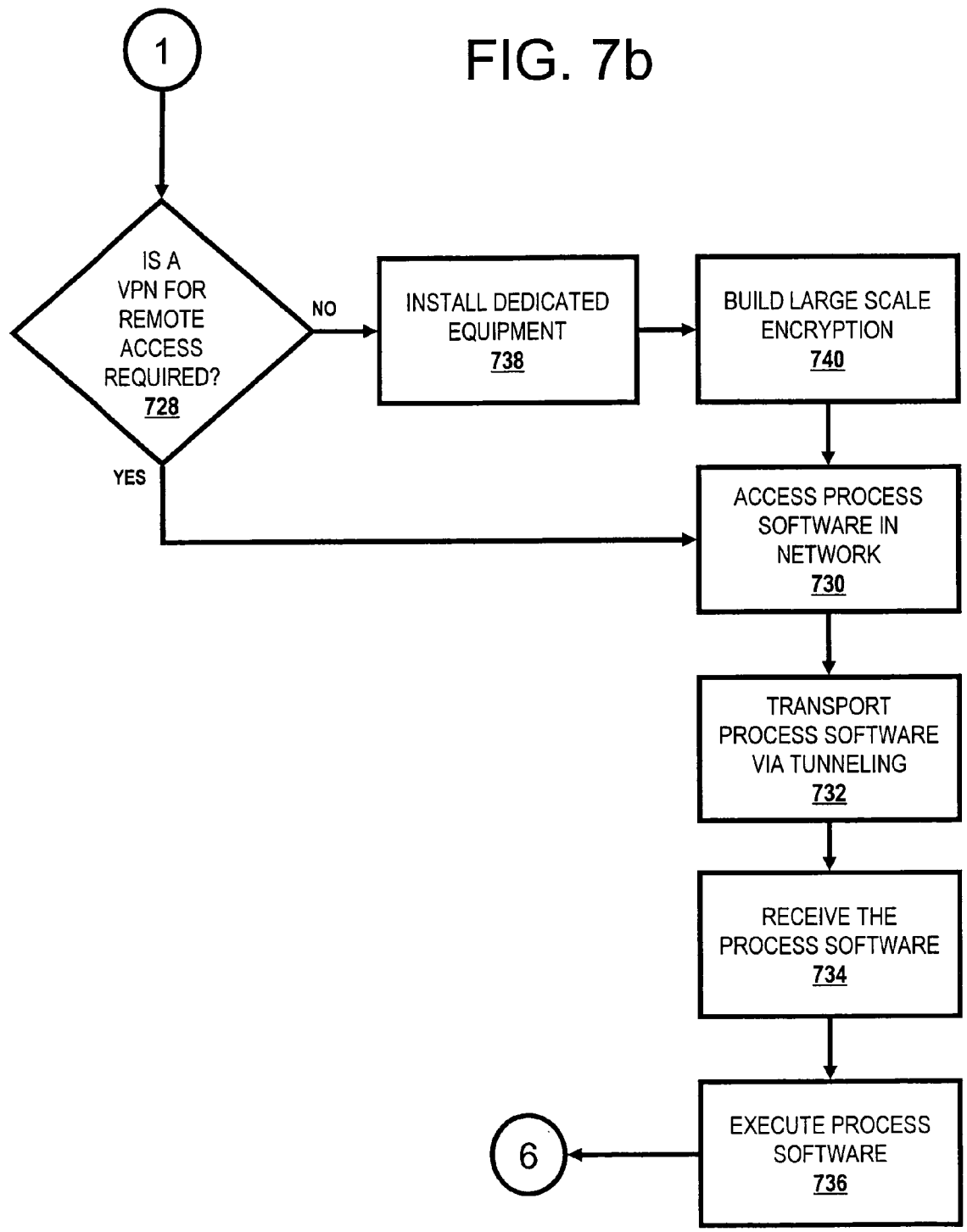

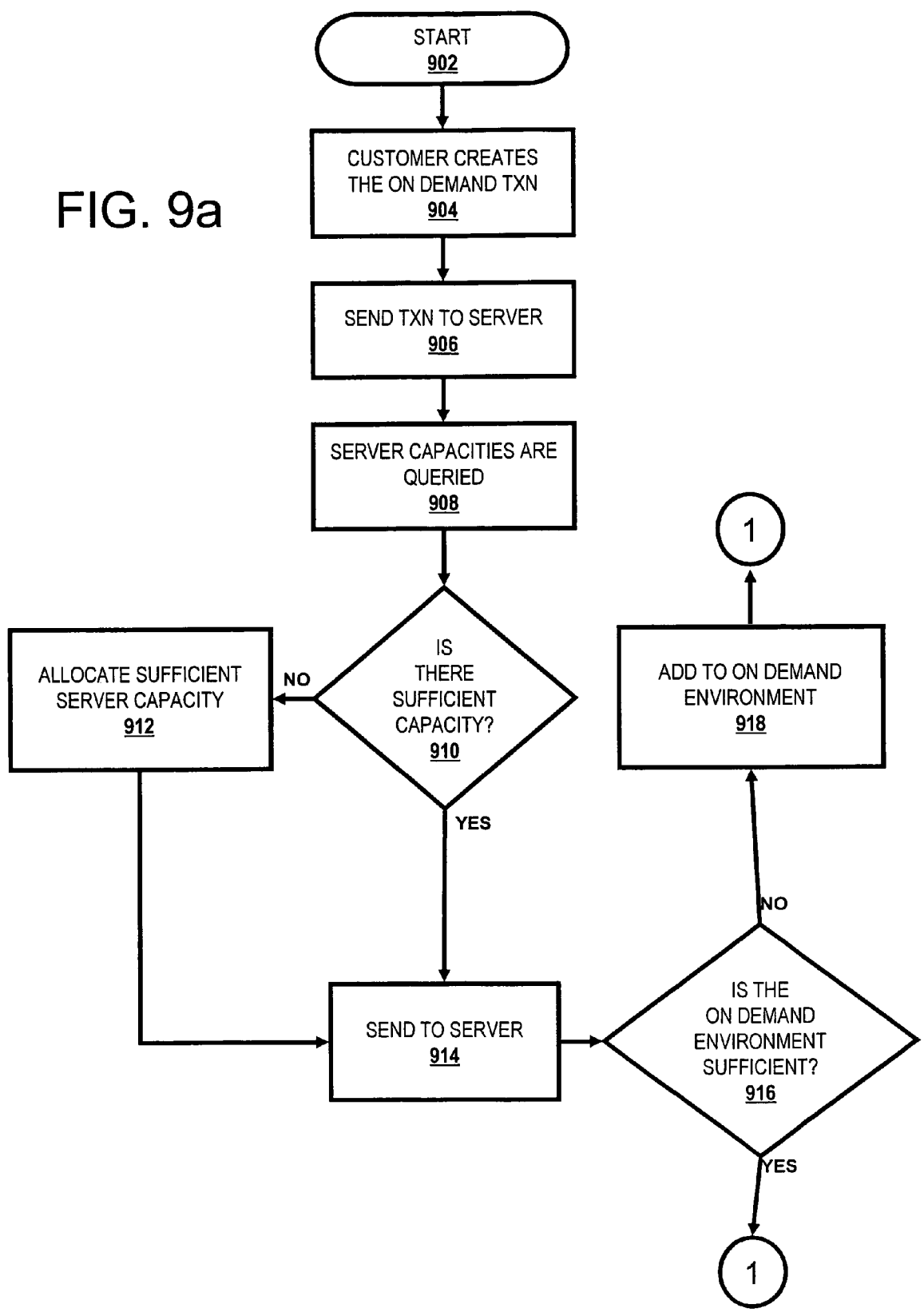

EXCEPTION THROWER

BACKGROUND OF THE INVENTION

The present invention relates in general to the field of computers and similar technologies, and in particular to software utilized in this field. More particularly, the present invention relates to exception throwers.

Computer systems process code that has been written and tested by software engineers using available testing and debugging tools. Such testing includes secondary field beta testing by volunteer users, which results in error/deficiency spotting, which results in the issuing upgraded/revised versions months and years later. Before sending the software out for field testing, the software engineers use laboratory tools, such as Java's Integrated Development Environment (IDE), to identify code that produces errors, both fatal and non-fatal.

An interface is made up of functions with inputs and outputs. For outputs, there are generally two forms: output and errors. In the Java® language, for example, there are return values (outputs) and exceptions (errors). When testing interfaces, tools such as IDE provide sophisticated support for debugging code. IDE includes a Java® programming editor that aids in the debugging process. This is accomplished by recognizing errors that occur while code is being compiling, and then highlighting the errors with distinctive colors. While IDE can recognize and can even suggest corrections to written code, IDE cannot describe what long-range effects the error has or can cause. That is, while IDE supports error trapping, error trapping is usually used to fix an existing bug. However, IDE does not provide tools or debugging aids for testing error handling code.

To test error handling code, developers have had to force error scenarios by writing specialized unit tests, changing code during testing, or taking unnatural process steps.

If a developer is comfortable using tools to test code, writing specialized unit tests may push the developer away from the testing tools of an IDE. Furthermore, many tests assume that error conditions are caused by bad input, which is not always the case. Unanticipated errors can happen from the conditions around the target component. Thus writing specialized unit tests that force bad input does not cover every testing scenario.

Changing code during testing is a dangerous practice. A software developer may choose to change a piece temporality (timing) to force an exception, such as adding a throw clause to a piece of code. However, if the developer forgets to remove this test code, then a permanent error condition is introduced.

Taking unnatural process steps is also problematic. For example, killing a particular process just to test an error handler may not be feasible if the error handling code in the same process as the code that generated the error. It is also difficult to properly determine when a process should be killed in many scenarios.

Error handling code that does not behave correctly can cause unwanted consequences in a system. For example, consider a transactional system that requires a rollback in case of a particular application exception. The error handler may not rollback properly, thus causing the system to have inconsistent data. Other unhandled exceptions may cause systems to freeze or even to crash.

For example, consider the scenario shown in FIG. 1. Calling component 102 is a software component (e.g., object) that calls a particular function or service. Target component 104 is software that services the request (\call operation\) from calling component 102. If target component 104 experiences an error when trying to service the request, then an error message (\throw ErrorException\) is returned to calling component 102. Calling component 102 then calls exception handler 106, which executes logic in response to the error. As noted above, traditional systems such as IDE's do not support testing of the code that is implemented by exception handler 106.

Object Oriented Programming (OOP), in which a system is viewed as a set of collaborating objects having methods (actions) and attributes (data), as well as procedural programming (in which calls are made to reusable subroutines), both focus on the separation and encapsulation of concerns (areas of interest) into single entities, by defining classes, methods, object factories, interfaces, etc. However, they do a poor job of addressing cross-cutting issues, such as step tracing, event logging, etc. That is, OOP and traditional linear programs have difficulty in handling code that runs across multiple software blocks caused by shared requirements among objects.

The problems described above also occur when using the programming paradigm known as Aspect-Oriented Programming (AOP). AOP focuses on a modularization and encapsulation of cross-cutting concerns. AOP addresses the issue of cross-cutting through the use of an aspect. An aspect packages advice (code that is applied to objects) and join points (points in the model where advice will be applied) into functional units in a manner that is analogous to the way OOP uses classes to package methods and attributes into objects. Join points may be at a method execution, an instantiation of an object, or a throwing of an exception.

An aspect can alter the behavior of base code (the non-aspect part of a program) by applying advice (additional behavior) to multiple join points (elements of the programming language semantics which the aspects coordinate with). This results in a logical description of a set of join points, called a pointcut. A pointcut can either match a join point or not at runtime, and may expose runtime information to a piece of advice.

Thus, an aspect is a stand-alone module that addresses operations that are scattered across (applied to) multiple program modules and tangled with (interdependent with) other modules. An aspect is made up of one or more advice (code snippets similar to methods) and a list of join points (points into a main program into which the advice should be weaved).

Weaving is the injecting of the advice presented in an aspect into the specified join points associated with each advice. That is, weaving coordinates aspects and non-aspects to ensure that advice executes at the appropriate dynamic join points.

Thus, whether a programmer is using AOP, OOP, or even linear programming, there is not a safe and efficient way to test error handling code.

SUMMARY OF THE INVENTION

To address the need described above for an improved method and system for testing error handling code, the present invention includes, but is not limited to, a method, apparatus and computer-usable medium for selecting a method signature to be error tested; selecting an error associated with the method signature from a menu; generating an aspect to be used in a pointcut for an exception that is to be thrown for the selected error; invoking code that generates the selected error; and identifying resultant errors caused by a selected component of the selected error.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 7a-c show a flow-chart of steps taken to deploy in a Virtual Private Network (VPN) software that is capable of executing the steps shown and described in FIGS. 1b-3;

FIGS. 9a-b show a flow-chart showing steps taken to execute the steps shown and described in FIGS. 1b-3 using an on-demand service provider.

DETAILED DESCRIPTION OF THE PREFERRED EMBODIMENT

A method, apparatus and computer-usable medium is presented for providing a way to generate error conditions from a development tool or technique. As presented herein, the error condition generation is transparent and requires no code changes to a core code implementation. The error condition generation can be accomplished statically so developers can test error handling code in a static manner. Alternatively, the error condition generation can be accomplished dynamically so that developers can generate an error condition while execution is stopped in a debug mode.

Figure 1A:
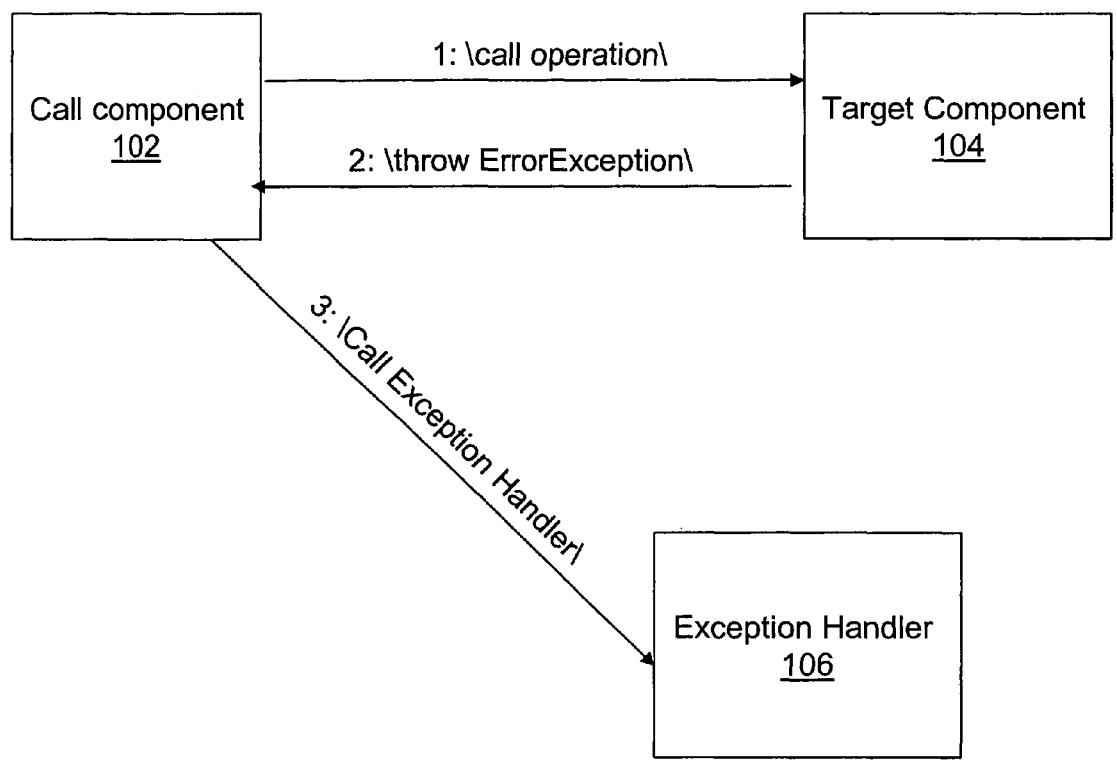
FIG. 1a illustrates a prior art system of handling exceptions.
Figure 1B:
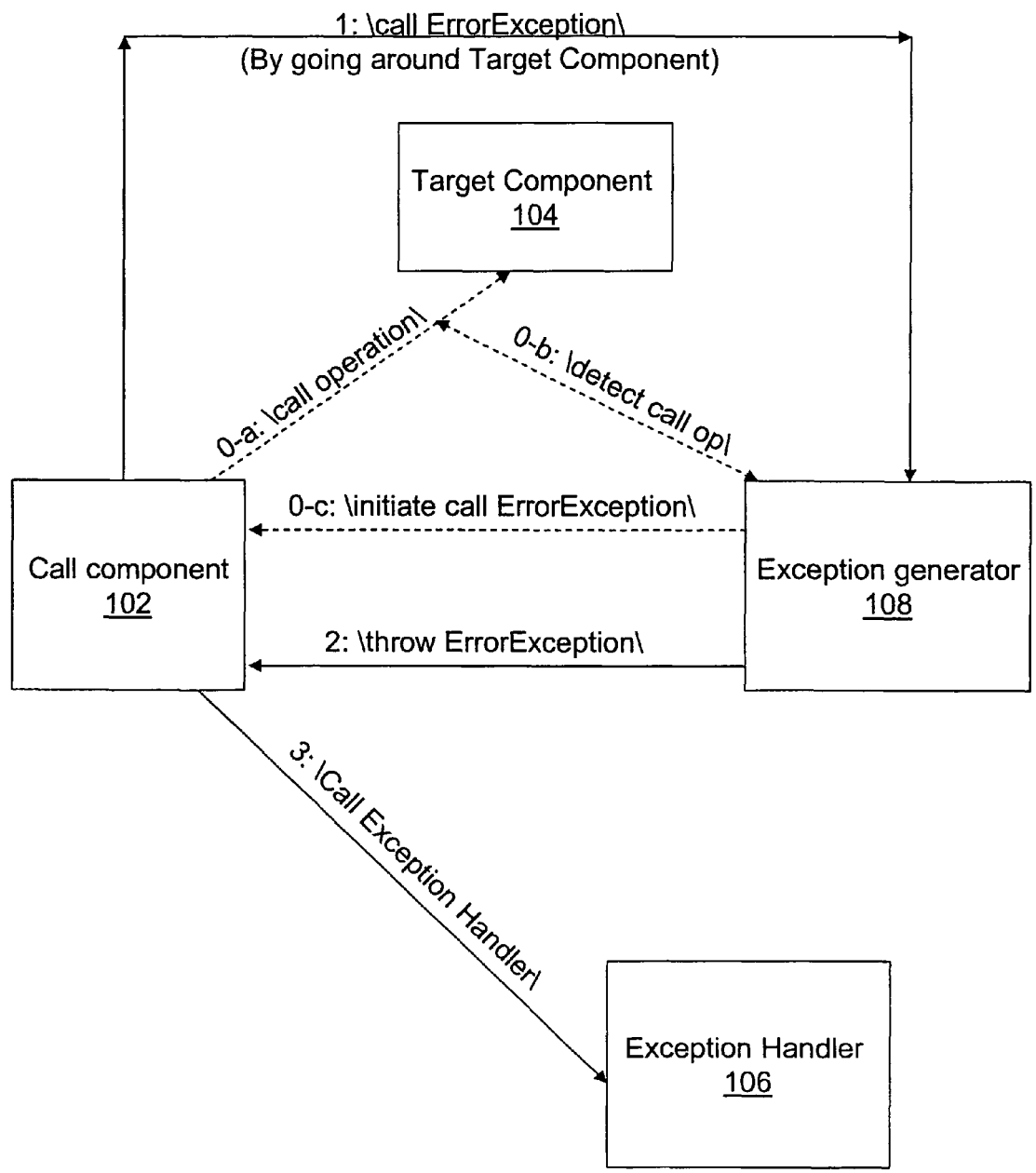
FIG. 1b depicts a novel method for throwing an exception from a specialized exception generator.

Referring now to FIG. 1b, there is depicted a novel system for calling an exception. Rather than sending a call to a target component 104, as shown in FIG. 1a, a call for an error (exception) is made to a specialized exception generator 108, which is preferably an object identified in AOP by a pointcut. As noted, in one embodiment, exception generator 108 intercepts (step "0-b") the \call operation\ from call component 102 (step "0-a") to target component 104, and initiates the \call ErrorException\ command (step "0-c") in call component 102. Call component 102 then calls the ErrorException (step "1") from exception generator, 108, which returns (throws) the ErrorException back to call component 102 (step "2"). Call component 102 then calls for the error exception handler logic (step "3") from exception generator 108 (thus going around target component 104).

Figure 2:
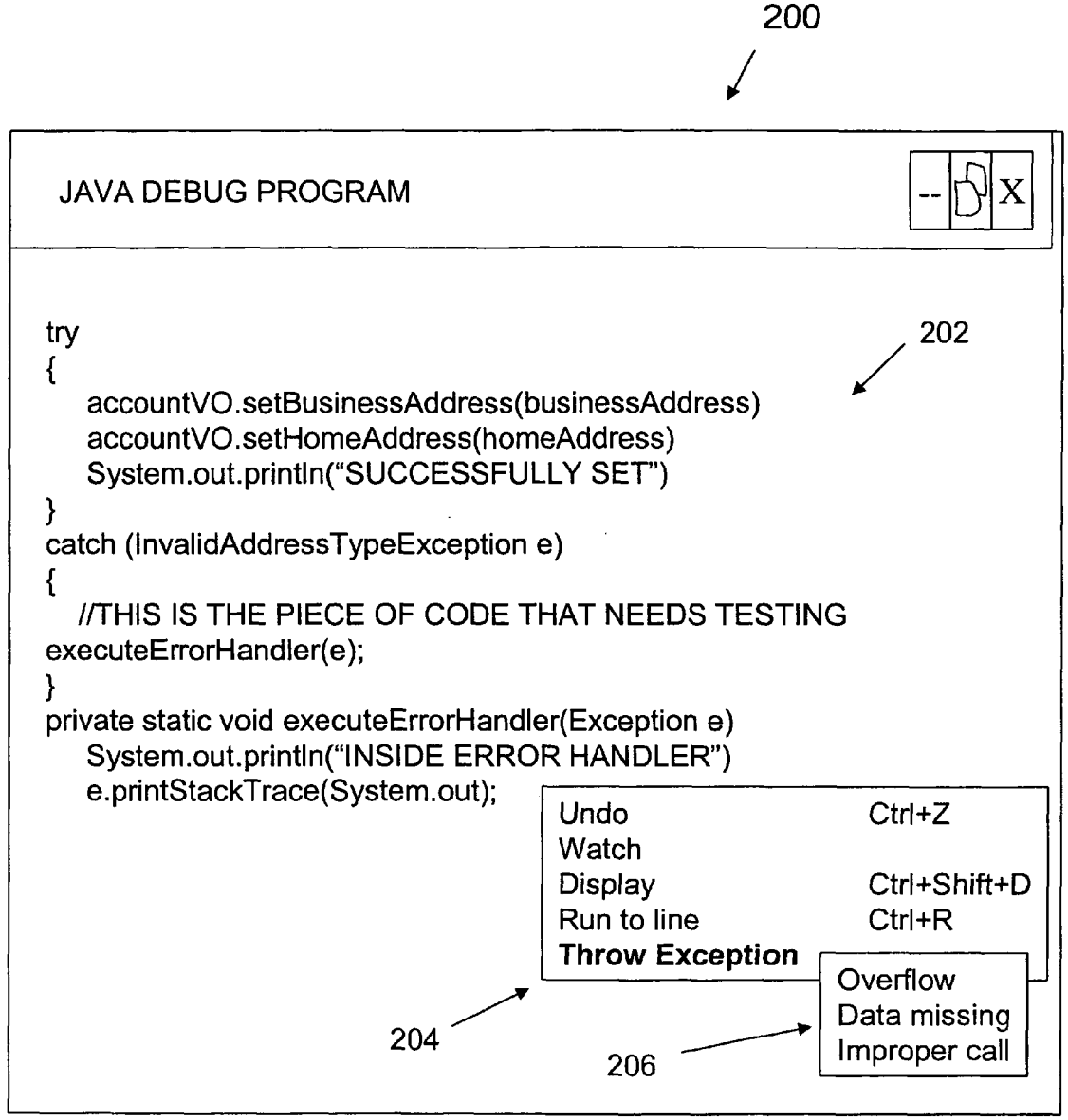
FIG. 2 presents a Graphical User Interface (GUI) of a debugger showing a novel option of calling an aspect in an Aspect-Oriented Programming (AOP) system to throw a selected exception.

With reference now to FIG. 2, there is depicted a Graphical User Interface (GUI) 200 showing a debug program 202 which uses a menu 204 that includes an option to throw an exception, such as may occur when the call described in FIG. 1b is made. To describe what is occurring when such an exception throw is invoked, the following static scenario is presented. Note that a dynamic scenario (which allows an IDE to compile the called exception on-the-fly) follows the same general steps described herein.

Through the use of AOP (and in particular, AspectJ), temporary functionality is added to applications in a transparent way. Using an IDE's ability to pull up a context menu, the "Throw Exception" option is added to the menu 204 shown in FIG. 2. Note that while menu 204 is shown as a pop-up menu, menu 204 may alternatively be any type of visual display of a menu, including pull-down menus, active windows, etc.

Consider the following exemplary Java code from debug program 202:

```
try
{
    accountVO.setBusinessAddress(businessAddress);
    accountVO.setHomeAddress (homeAddress);
}
catch(InvalidAddressTypeException e)
{
    //THIS IS THE PIECE OF CODE THAT NEEDS TESTING
    executeErrorHandler(e)
}
```

Upon catching an exception, an execution thrower (as shown in FIG. 1b as Exception generator 108) executes and returns the appropriate error condition, and allows the calling component to execute an error handler that should execute gracefully and not cause any damage to existing "real" code. To test this, the following code gets executed by the snippet shown above:

```
/**
 * Sets the businessAddress.
 * @param businessAddress The businessAddress to set
 */
public void setBusinessAddress (AddressVO businessAddress) throws
InvalidAddressTypeException
{
if(businessAddress.getAddressType( ).equals(Ad-
dressVO.BUSINESSADDRESS))
    this.businessAddress = businessAddress;
else
    throw new InvalidAddressTypeException ("AddressType not business
address");
}
```

Rather than modify the code, IDE features (which allow direct "insertion" of the code) are used to test this bit of code. Thus, by clicking "Throw Exception" shown in menu 204, the steps shown in FIG. 3 are executed.

Figure 3:
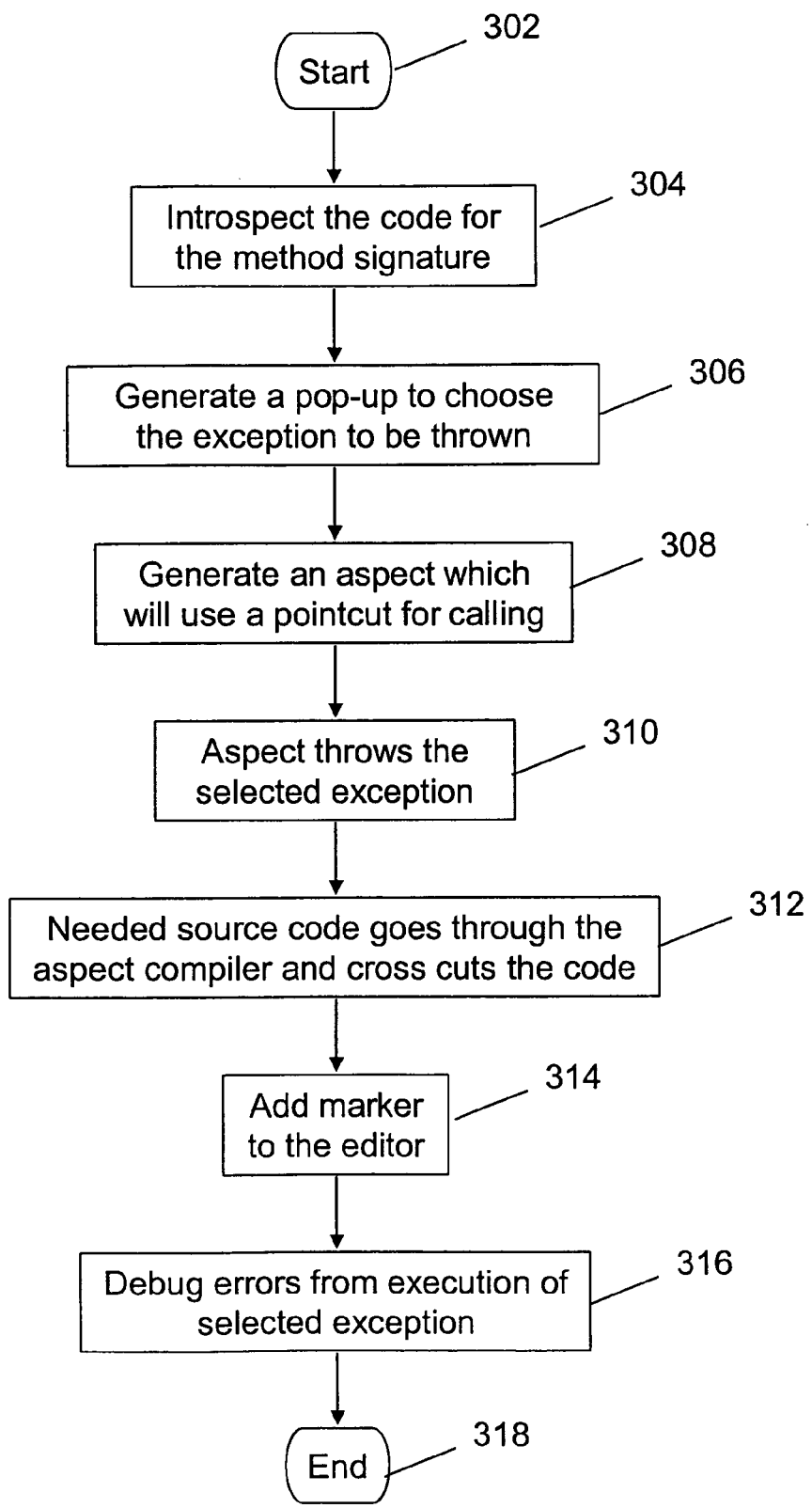
FIG. 3 is a flow-chart of exemplary steps taken in an AOP environment to force an error condition (throw an exception)

Referring then to FIG. 3, after initiator block 302, the method signature to be tested (e.g., "ErrorHandler(e)") is selected (block 304). The menu 204 (shown in FIG. 2) is generated, including a secondary menu 206 showing choices of exceptions that can be thrown. An aspect to be used in a pointcut for the thrown exception is generated (block 308), and the aspect then throws the selected exception (block 310). Any needed source code then goes through an aspect compiler (part of an AOD suite), and cross cuts the code (i.e., is applied to all relevant objects), as shown in block 312. In order to aid in the debugging process for the thrown execution, markers are added (block 314). Errors caused by the execution of the thrown exception are then debugged (block 316), and the process ends (terminator block 318).

An exemplary aspect that gets generated is:

```
public aspect InvalidAddressFromSetBusinessAddress
{
pointcut void_setBusinessAddress( ) : call (void
accountVO.setBusinessAddress(AddressVO));
        Object around( ) : void_setBusinessAddress( )
    {
        //THE AROUND ADVICE WILL JUST THROW THE ERROR
        OF INTEREST
throw new InvalidAddressTypeException ("Tool generated for testing
error code");
    }
}
```

The aspect shown uses the "around advice." The around advice gets called instead of the actual business method. Once the error handling code is tested, the aspect can be removed, the application re-compiled, and the code continues to execute normally. For precautionary measures, warnings should be added, either as comments in the code or through a warning message generated by the IDE, that an Exception thrower has been added, and should be removed once error handling is tested.

While the preferred embodiment has been shown in a Java environment, the present invention may be utilized in any language having exceptions as constructs, such as C++. Furthermore, any interceptor patterns may be used to accomplish the function described above for aspects.

Figure 4:
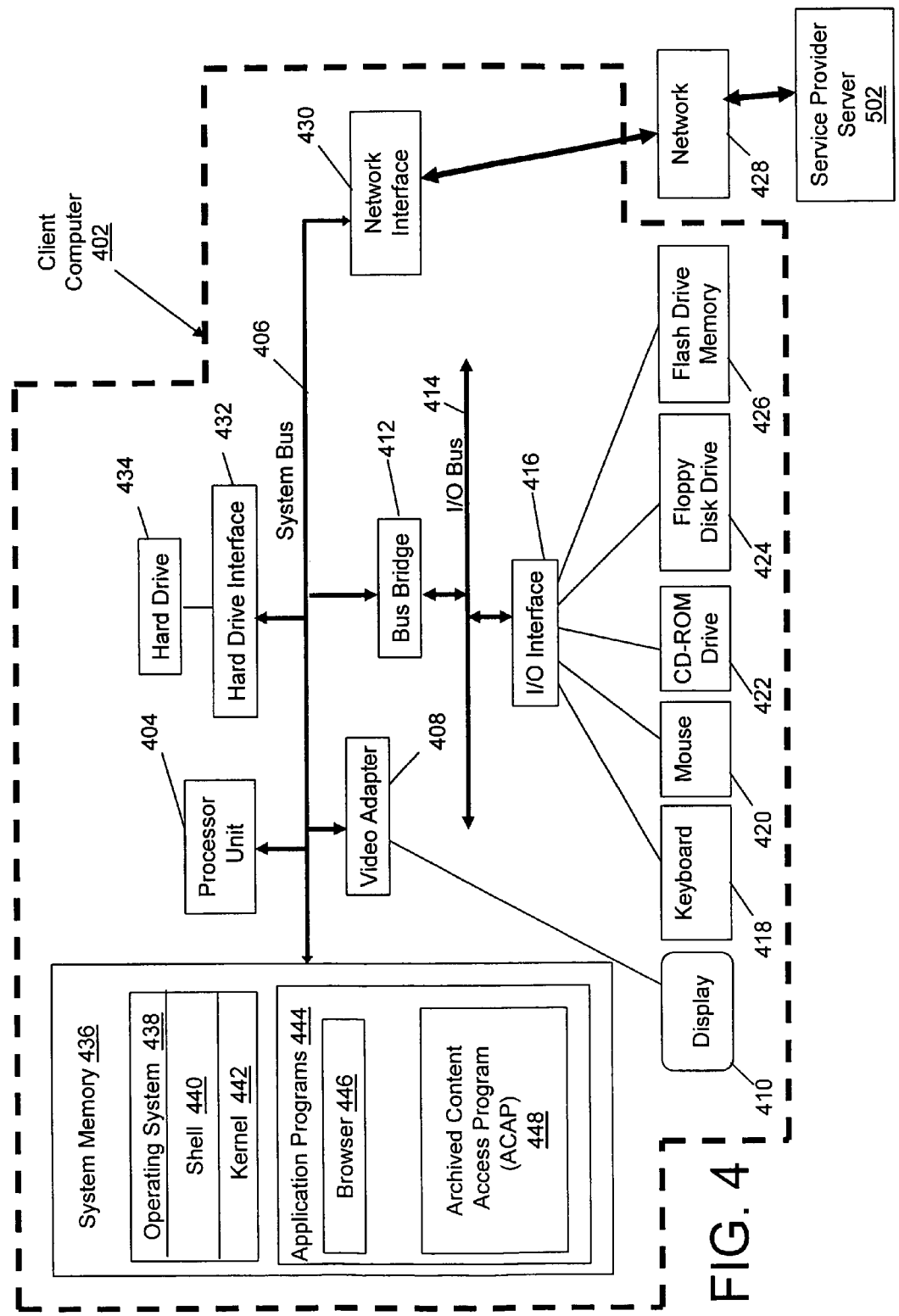
FIG. 4 depicts an exemplary client computer in which the present invention may implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk—Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts-of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include an Exception Thrower (ET) 448. ET 448 includes code for implementing the processes described in FIGS. 1b-3. In one embodiment, client computer 402 is able to download ET 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

Figure 5:
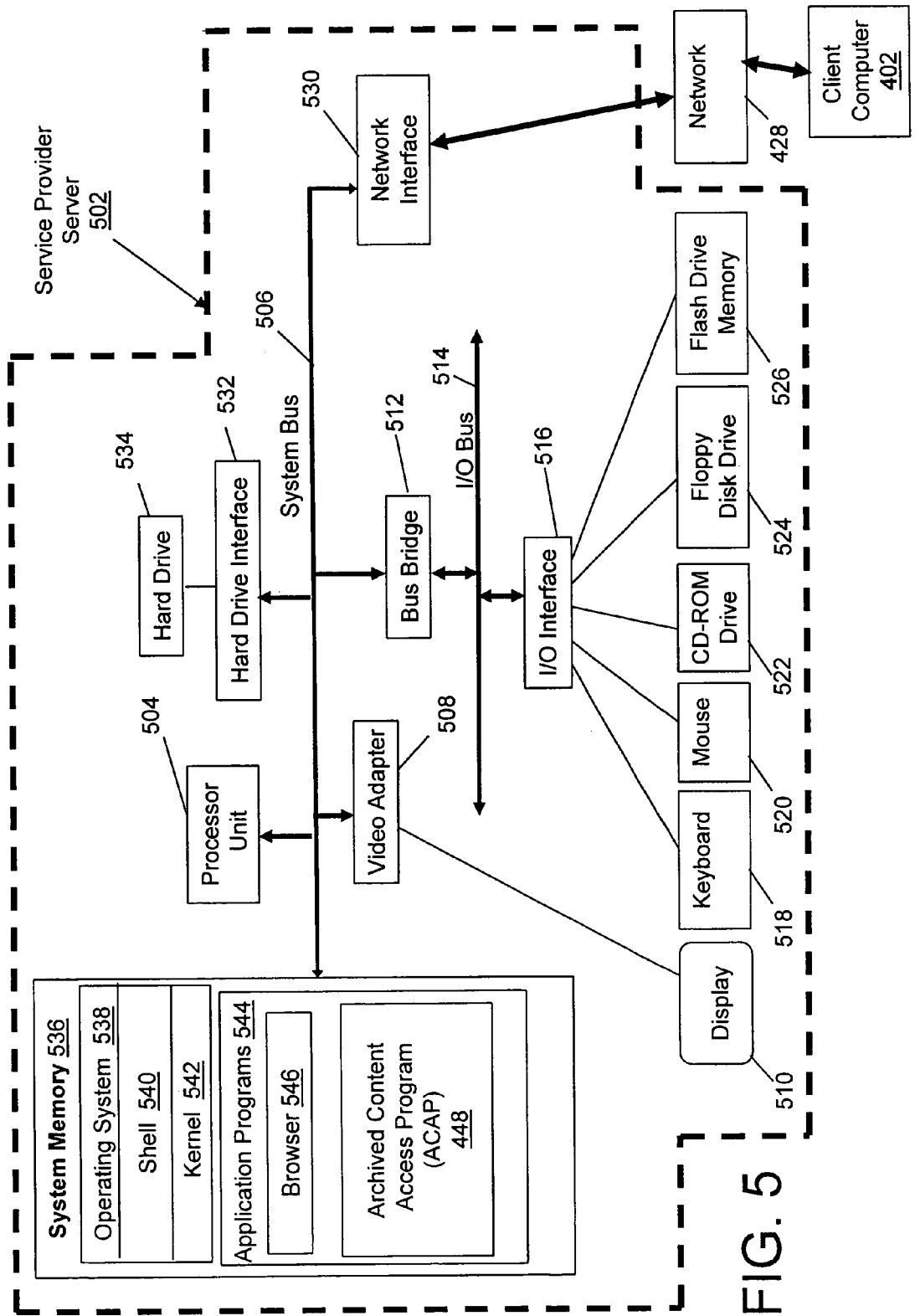
FIG. 5 illustrates an exemplary server from which software for executing the present invention may be deployed and/or implemented for the benefit of a user of the client computer shown in FIG. 4.

As noted above, ET 448 can be downloaded to client computer 502 from service provider server 502, shown in exemplary form in FIG. 5. Service provider server 502 includes a processor unit 504 that is coupled to a system bus 506. A video adapter 508 is also coupled to system bus 506. Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk—Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download ET 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of ET 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of ET 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of ET 448, are performed by service provider server 502. Alternatively, ET 448 and the method described herein, and in particular as shown and described in FIGS. 1b-3, can be deployed as a process software from service provider server 502 to client computer 402. Still more particularly, process software for the method so described may be deployed to service provider server 502 by another service provider server (not shown).

Figure 6A:
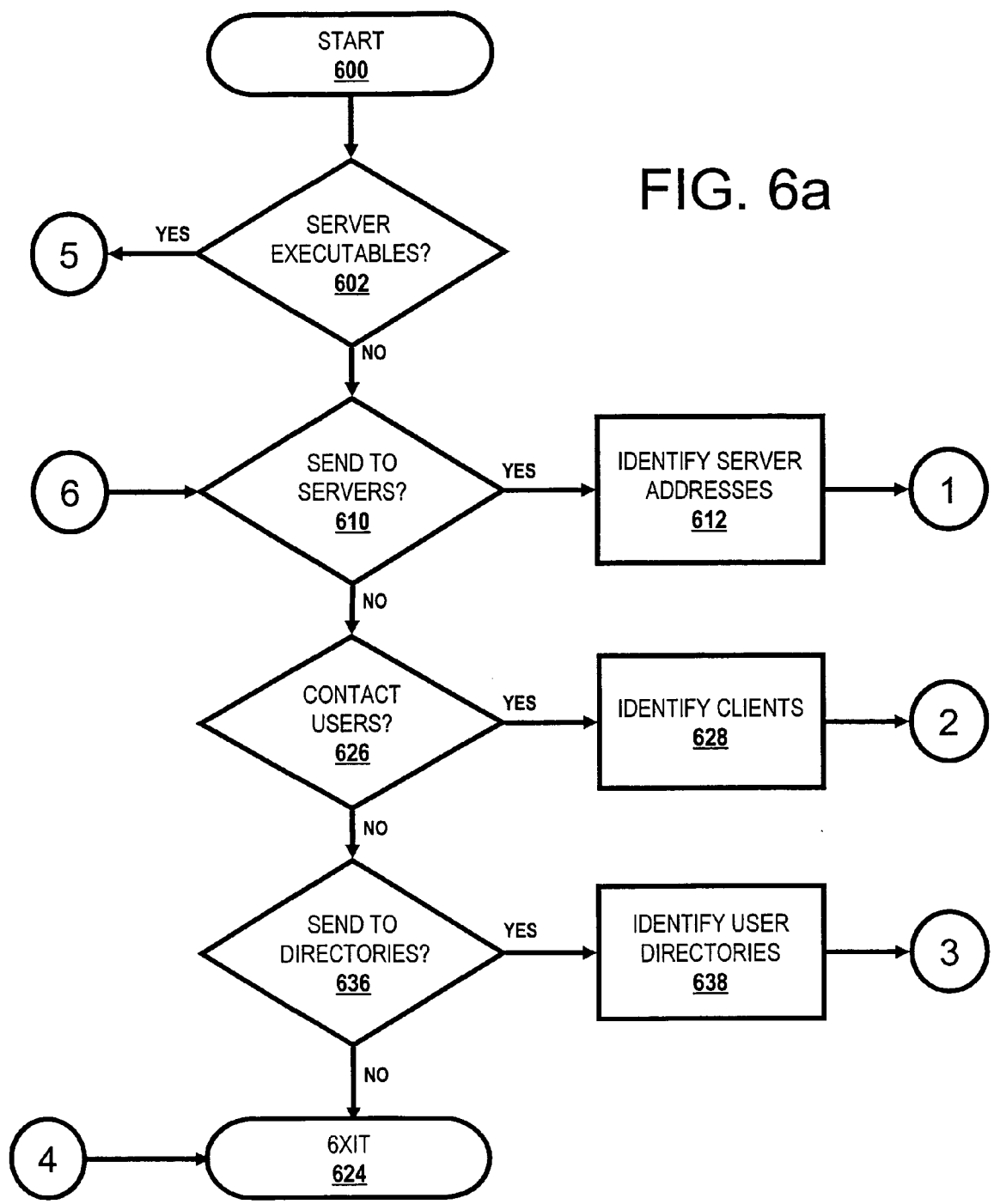
FIGS. 6a-b show a flow-chart of steps taken to deploy software capable of executing the steps shown and described in FIGS. 1b-3.
Figure 6B:
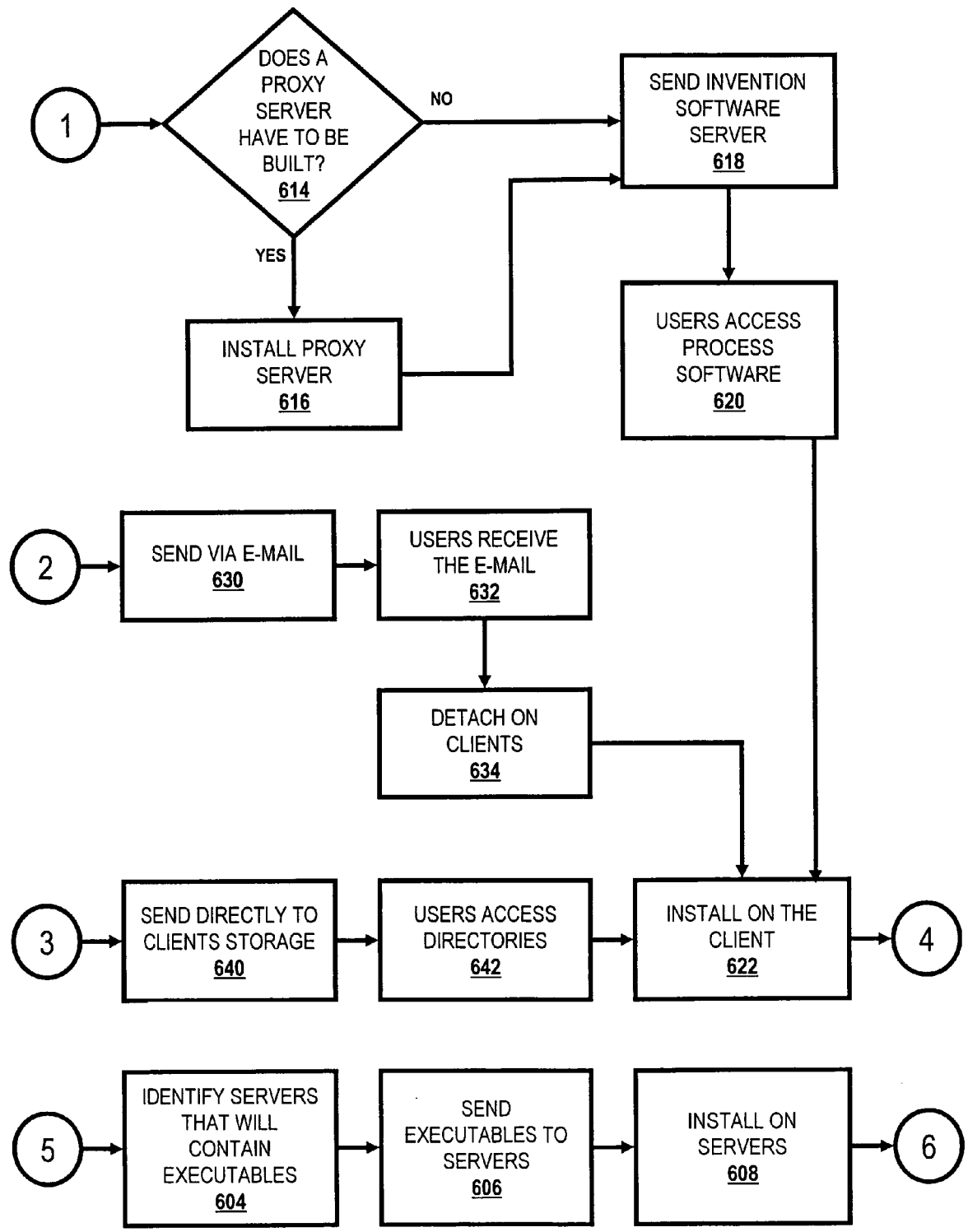

Referring then to FIG. 6, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether to the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides else-where) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 7A:
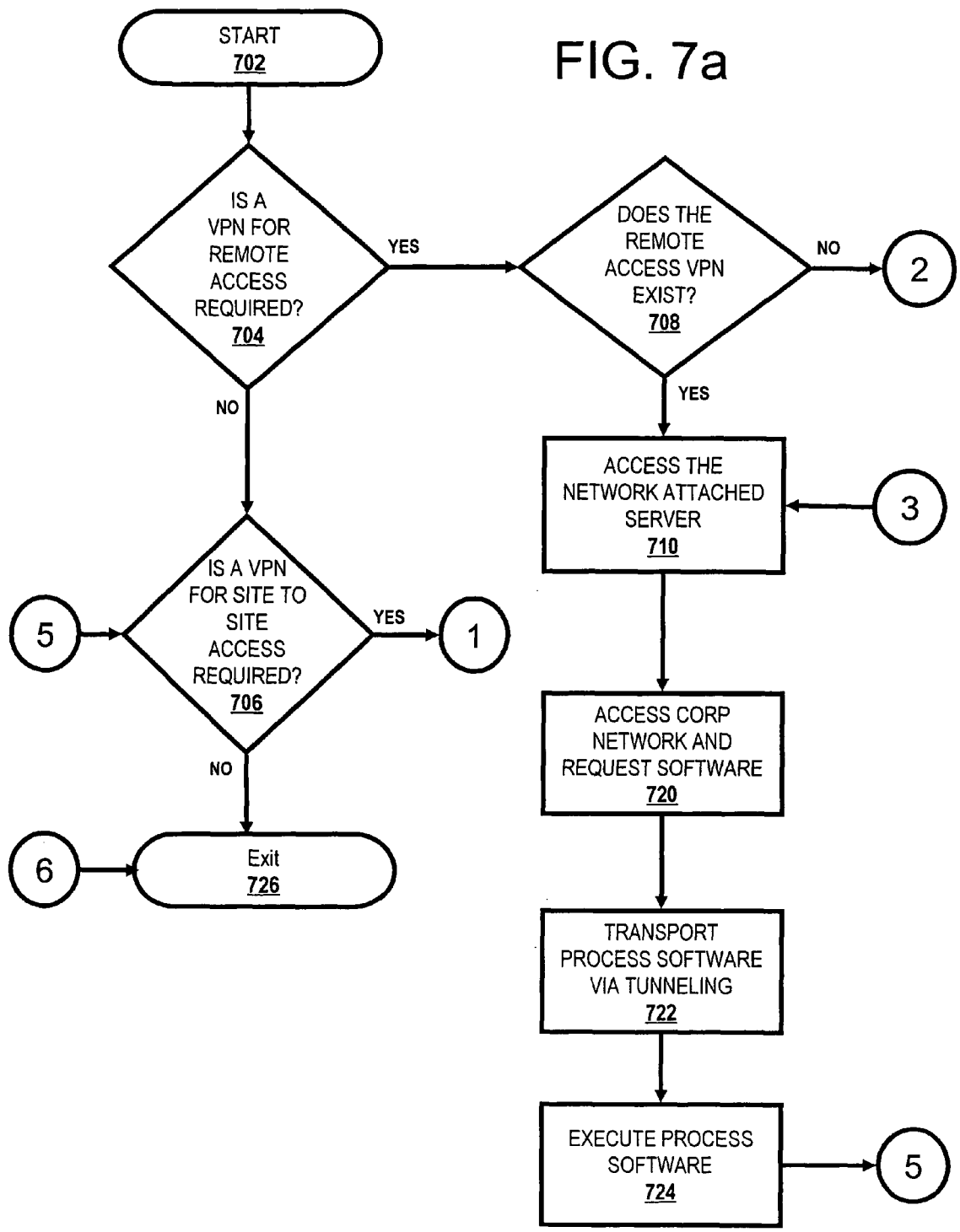
Figure 7C:
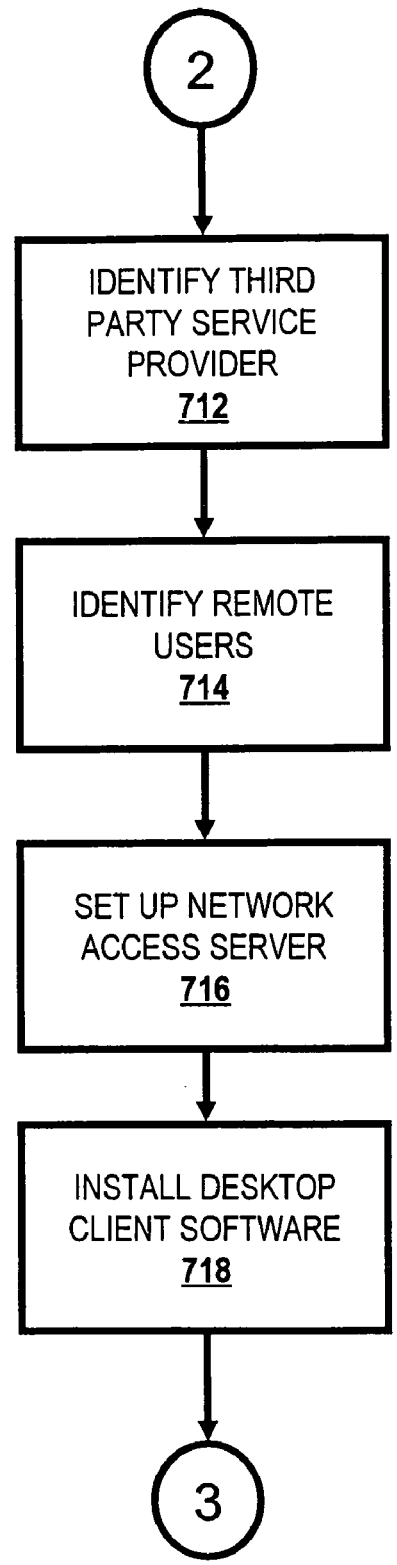

The process for such VPN deployment is described in FIG. 7. Initiator block 702 begins the Virtual Private Network (VPN) process. A determination is made to see if a VPN for remote access is required (query block 704). If it is not required, then proceed to (query block 706). If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is, the process software is divided into packets and each packet including the data and protocol is placed within another packet (block 722). When the process software arrives at the remote user's desktop, it is removed from the packets, reconstituted and then is executed on the remote user's desktop (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 738). Then build the large scale encryption into the VPN (block 740).

After the site to site VPN has been built or if it had been previously established, the users access the process software via the VPN (block 730). The process software is transported to the site users over the network via tunneling (block 732). That is, the process software is divided into packets and each packet including the data and protocol is placed within another packet (block 734). When the process software arrives at the remote user's desktop, it is removed from the packets, reconstituted and is executed on the site user's desktop (block 736). The process then ends at terminator block 726.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8A:
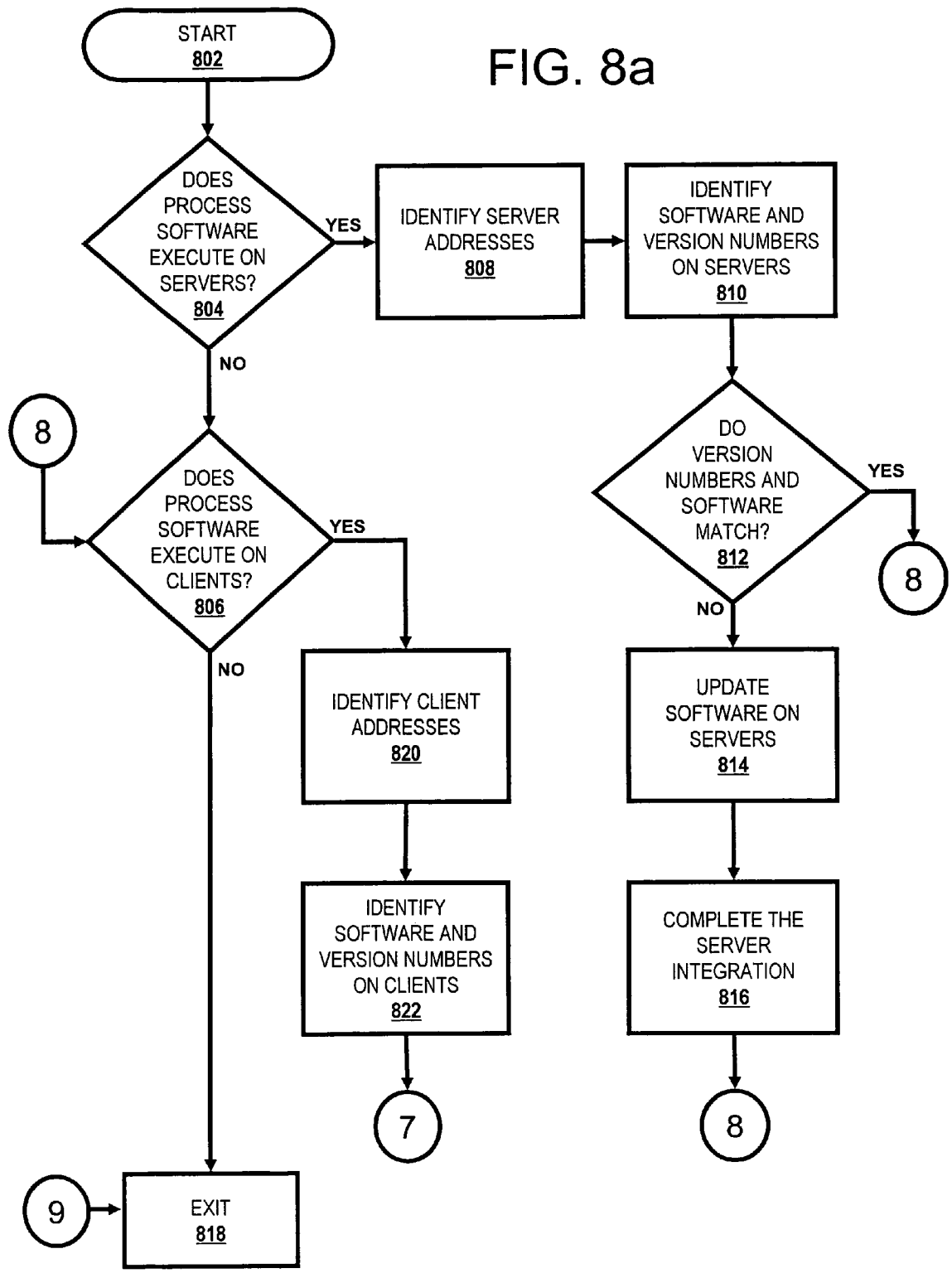
FIGS. 8a-b show a flow-chart showing steps taken to integrate into a computer system software that is capable of executing the steps shown and described in FIGS. 1b-3.
Figure 8B:
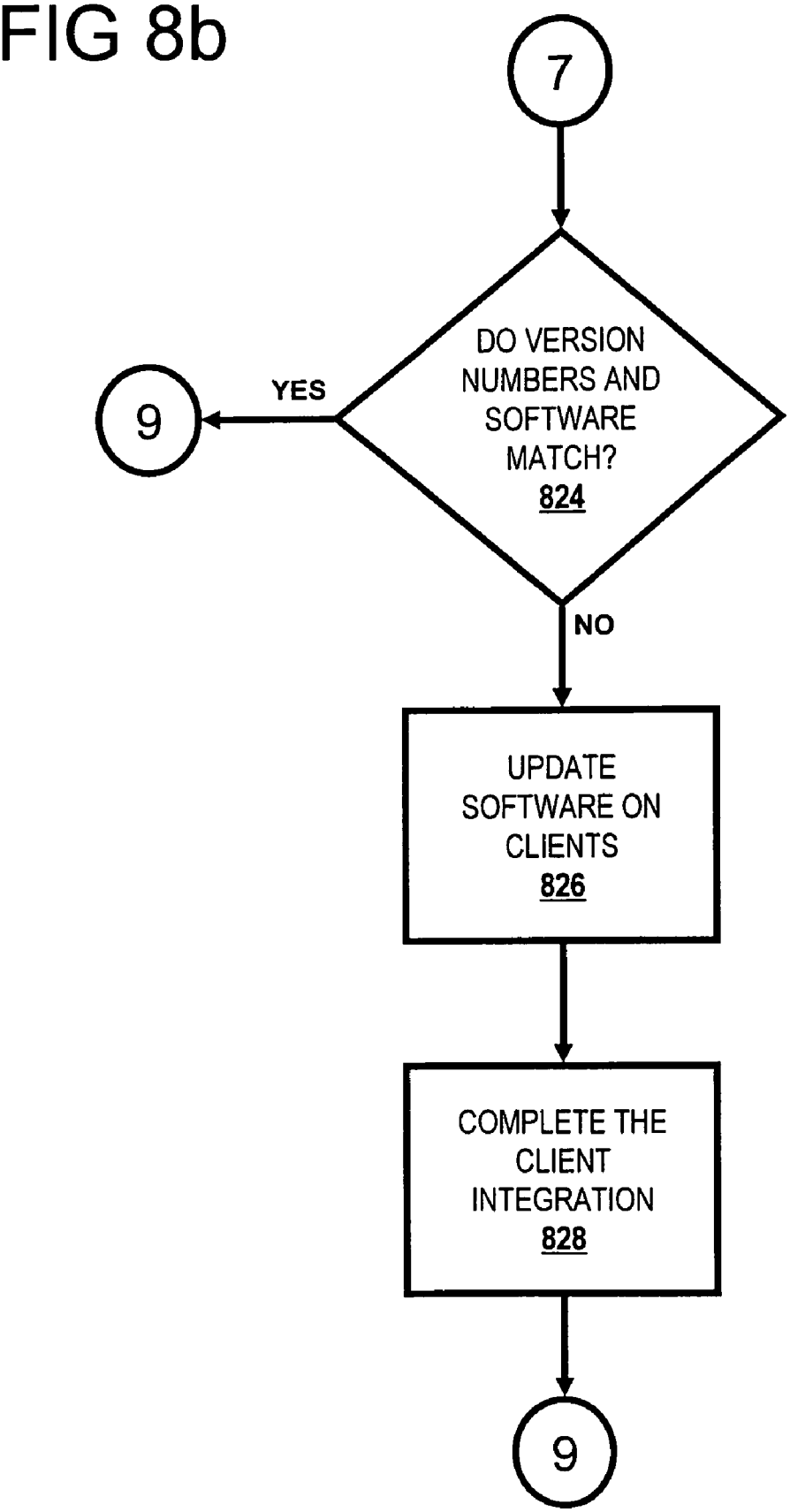

For a high-level description of this process, reference is now made to FIG. 8. Initiator block 802 begins the integration of the process software. The first tiling is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made is the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9B:
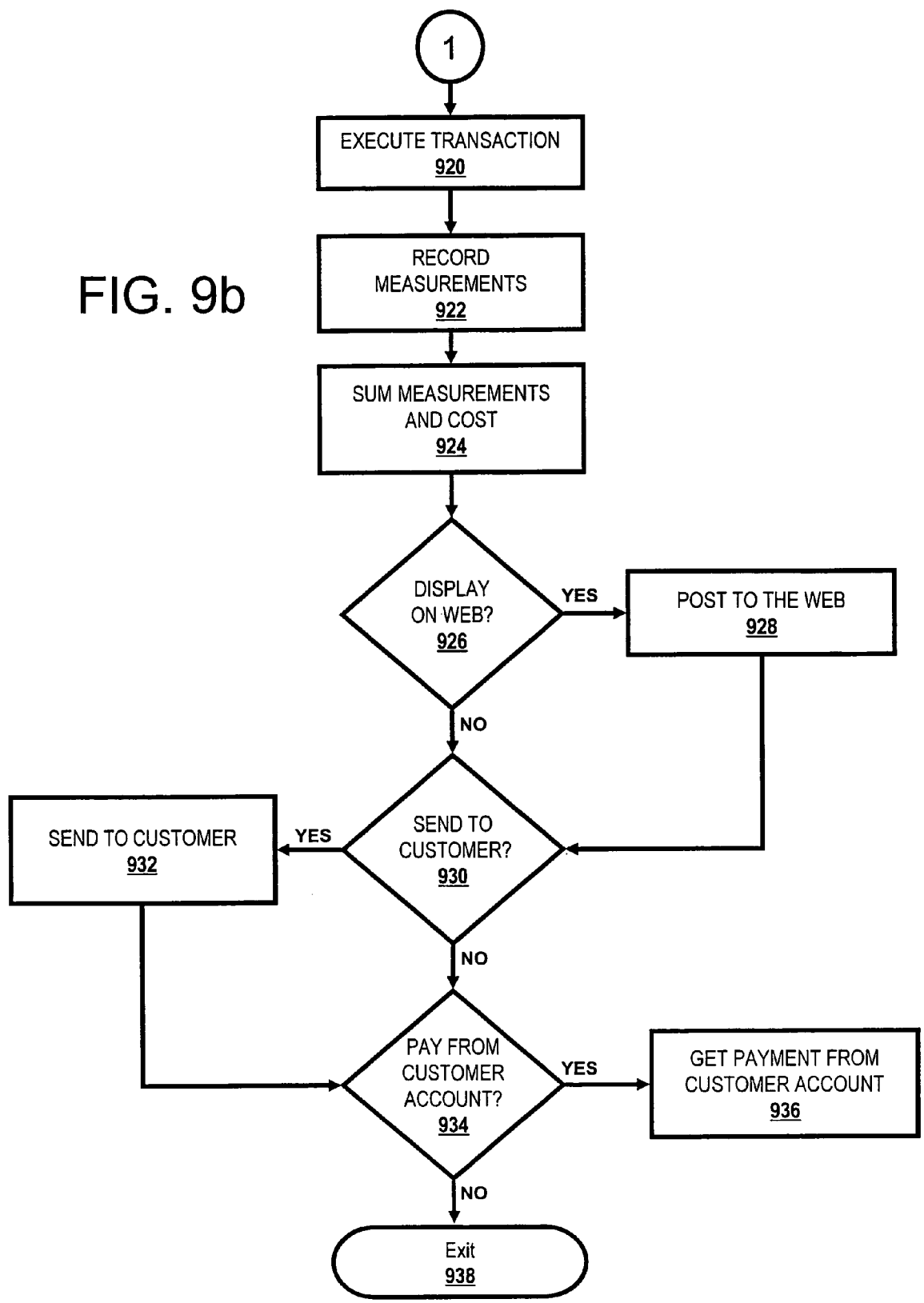

With reference now to FIG. 9, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient Available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method comprising:
receiving a selected method signature to be error tested;
generating an on-screen menu of multiple user-selectable errors associated with the selected method signature;
receiving from the on-screen menu a selected error that is associated with the selected method signature, wherein the selected error is selectively chosen by a user;
generating an aspect to be used in a pointcut for an error exception that is to be thrown for the selected error;
invoking selected code that generates the selected error, wherein the selected error is generated by an exception generator in response to the exception generator detecting a call component making a call to a target component for the selected method signature, wherein the target component services requests for a particular function from the call component, and wherein the exception generator bypasses the target component to generate the selected error;
transmitting the error exception from the exception generator to the call component for handling by an exception handler; and
identifying, by the exception handler, resultant errors caused by the target component of the selected error.

2. The computer-implemented method of claim 1, further comprising:
wherein the selected error is thrown from the exception generator to the call component to cause said invoking transmitting and identifying.

3. The computer-implemented method of claim 1, further comprising:
adding a marker to an editor to indicate that the call from a the call component to the target component is to be intercepted, thus resulting in a call from the call component to the exception generator to throw the error exception.

4. The computer-implemented method of claim 1, wherein the target component is called from the exception generator that contains code for generating selected errors that are associated with the selected method signature to be tested, and wherein the selected error is generated from the aspect that was generated.

5. The computer-implemented method of claim 1, wherein the computer-implemented method is implemented in an Aspect-Oriented Programming (AOP) environment.

6. The computer-implemented method of claim 5, wherein the selected error is thrown by an AOP aspect.

7. The computer-implemented method of claim 1, wherein the multiple user-selectable errors comprise an overflow error, a data missing error, and an improper call error.

8. A system comprising:
a processor;
a data bus coupled to the processor; and
a non-transitory computer-usable medium embodying computer program code, the non-transitory computer-usable medium being coupled to the data bus, the computer program code comprising instructions executable by the processor and configured to:
select a method signature to be error tested;
generate an on-screen menu of multiple user-selectable errors associated with the method signature;
select from the on-screen menu an error that is associated with the method signature, wherein the selected error is selectively chosen by a user;
generate an aspect to be used in a pointcut for an error exception that is to be thrown for the selected error;
invoke selected code that generates the selected error, wherein the selected error is generated by an exception generator in response to the exception generator detecting a call component making a call to a target component for the method signature, wherein the target component services requests for a particular function from the call component, and wherein the exception generator bypasses the target component to generate the selected error;
transmit the error exception from the exception generator to the call component for handing by an exception handler; and
identify by the exception handler resultant errors caused by the target component of the selected error.

9. The system of claim 8, wherein the instructions are further configured to:
wherein the selected error is thrown from the exception generator to the call component to cause an execution of the instructions to generate said aspect, invoke said selected code, and identify said resultant errors.

10. The system of claim 8, wherein the instructions are further configured to:
add a marker to an editor to indicate that the call from the call component to the target component is to be intercepted, thus resulting in a call from the call component to the exception generator to throw the error exception.

11. The system of claim 8, wherein the target component is called from the exception generator that contains code for generating selected errors that are associated with the method signature to be tested, and wherein the selected error is generated from the aspect that was generated.

12. The system of claim 8, wherein the system is implemented in an Aspect-Oriented Programming (AOP) environment.

13. The system of claim 12, wherein the selected error is thrown by an AOP aspect.

14. A non-transitory computer-readable storage medium embodying computer program code, the computer program code comprising computer executable instructions configured to:
select a method signature to be error tested;
generate an on-screen menu of multiple user-selectable errors associated with the method signature;
select from the on-screen menu an error that is associated with the method signature, wherein the selected error is selectively chosen by a user;
generate an aspect to be used in a pointcut for an error exception that is to be thrown for the selected error;
invoke selected code that generates the selected error, wherein the selected error is generated by an exception generator in response to the exception generator detecting a call component making a call to a garget component for the method signature, wherein the target component services requests for a particular function from the call component, and wherein the exception generator bypasses the target component to generate the selected error;

transmit the error exception from the exception generator to the call component for handing by an exception handler; and identify by the exception handler resultant errors caused by the target component of the selected error.

15. The non-transitory computer-readable storage medium of claim 14, wherein the multiple user-selectable errors comprise an overflow error, a data missing error, and an improper call error.

16. The non-transitory computer-readable storage medium of claim 14, wherein the embodied computer program code further comprises computer executable instructions configured to:

wherein the selected error is thrown from the exception generator to the call component to cause an execution of the computer executable instructions to generate said aspect, invoke said selected code, and identify said resultant errors.

17. The non-transitory computer-readable storage medium of claim 14, wherein the embodied computer program code further comprises computer executable instructions configured to:

add a marker to an editor to indicate that the call from the call component to a the target component is to be intercepted, thus resulting in a call from the call component to the exception generator to throw the error exception.

18. The non-transitory computer-readable storage medium of claim 14, wherein the target component is called from the exception generator that contains code for generating selected errors that are associated with the method signature to be tested, and wherein the selected error is generated from the aspect that was generated.

19. The non-transitory computer-readable storage medium of claim 14, wherein the program code is implemented in an Aspect-Oriented Programming (AOP) environment.

20. The non-transitory computer-readable storage medium of claim 19, wherein the selected error is thrown by an AOP aspect.

* * * * *